United States Patent
Wu et al.

(10) Patent No.: US 10,826,396 B1
(45) Date of Patent: Nov. 3, 2020

(54) AUTOMATIC BANDWIDTH CONTROL SYSTEM FOR ANY SWITCHING FREQUENCY OF POWER CONVERTER

(71) Applicant: ANPEC ELECTRONICS CORPORATION, Hsinchu (TW)

(72) Inventors: Cheng-Han Wu, Hsinchu (TW); Fu-Chuan Chen, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/678,933

(22) Filed: Nov. 8, 2019

(30) Foreign Application Priority Data

Aug. 15, 2019 (TW) ............................. 108129166 A

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC .................................................. H02M 3/158
See application file for complete search history.

(56) References Cited

U.S. PATENT DOCUMENTS

| 9,991,775 B1* | 6/2018 | Lin ..................... H02M 3/156 |
| 10,122,278 B1* | 11/2018 | Xue ..................... H02M 1/00 |
| 2018/0048232 A1* | 2/2018 | Adell ..................... H03L 7/085 |

* cited by examiner

*Primary Examiner* — Thienvu V Tran
*Assistant Examiner* — Sisay G Tiku
(74) *Attorney, Agent, or Firm* — Li & Cai Intellectual Property (USA) Office

(57) ABSTRACT

An automatic bandwidth control system for any switching frequency of a power converter is provided. A pulse generator outputs a preset clock signal according to a comparing signal. A control circuit controls a first switch and a second switch according to frequencies of the preset clock signal and an external clock signal. A first current mirror is connected to an input voltage source and a first terminal of the first switch. A second comparator compares an output voltage of a second reference voltage source with an output voltage of the first current mirror to output the comparing signal. A second current mirror is connected to the input voltage source, an error amplifier and a first terminal of the second switch. A transconductance gain of the error amplifier is controlled by a current of the second current mirror to adjust a bandwidth of the power converter.

6 Claims, 10 Drawing Sheets

AUTOMATIC BANDWIDTH CONTROL SYSTEM FOR ANY SWITCHING FREQUENCY OF POWER CONVERTER

CROSS-REFERENCE TO RELATED PATENT APPLICATION

This application claims the benefit of priority to Taiwan Patent Application No. 108129166, filed on Aug. 15, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to an automatic bandwidth control system for any switching frequency of a power converter.

BACKGROUND OF THE DISCLOSURE

In recent years, with the advancement of technology, electronic products with various functions have been gradually developed. The electronic products with various functions can meet different requirements and have become an indispensable part of people's daily lives, making people's lives more convenient. The various electronic products with different functions are composed of various electronic components, and each of the electronic components requires different power supply voltages. Therefore, in order to make the electronic products with various functions function properly, a power convertor circuit needs to convert an input voltage into an appropriate voltage to be supplied to the electronic components.

SUMMARY OF THE DISCLOSURE

In response to the above-referenced technical inadequacies, the present disclosure provides an automatic bandwidth control system for any switching frequency of a power converter. The power converter includes an error amplifier, a first comparator, a driver circuit and a switch circuit. An input terminal of the error amplifier is connected to a first reference voltage source. Another input terminal of the error amplifier is connected to an output terminal of the switch circuit. An input terminal of the first comparator is connected to an input terminal of the switch circuit. Another input terminal of the first comparator is connected to an output terminal of the error amplifier. The input terminal of the switch circuit is connected to an input voltage source. An input terminal of the driver circuit is connected to an output terminal of the first comparator. A control terminal of the switch circuit is connected to an output terminal of the driver circuit. The automatic bandwidth control system includes a pulse generator, a control circuit, a first switch, a first current mirror, a second comparator, a second switch, and a second current mirror. The pulse generator is configured to output a preset clock signal according to a comparing signal. The control circuit is connected to the pulse generator and configured to compare a frequency of the preset clock signal with a frequency of an external clock signal from an external circuit to output a control signal. The control terminal of the first switch is connected to the control circuit and configured to be controlled by the control signal. The first current mirror is connected to the input voltage source and a first terminal of the first switch. A second terminal of the first switch is grounded. The second comparator has a first input terminal and a second input terminal. The first input terminal is connected to a second reference voltage source. The second input terminal is connected to the first current mirror. An output terminal of the second comparator is connected to the pulse generator. The second comparator is configured to compare an output voltage of the second reference voltage source with an output voltage of the first current mirror to output the comparing signal. A control terminal of the second switch is connected to the control circuit and configured to be controlled by the control signal. The second current mirror is connected to the input voltage source and a first terminal of the second switch. A second terminal of the second switch is grounded. The second current mirror is connected to the error amplifier and provides a current to the error amplifier. A transconductance gain of the error amplifier varies with the current such that a bandwidth of the power converter is adjusted with a frequency of the external clock signal.

In certain embodiments, the control circuit includes a phase-locked loop.

In certain embodiments, the automatic bandwidth control system includes a third switch. A first terminal of the third switch is connected to the second input terminal of the second comparator. A second terminal of the third switch is grounded. A control terminal of the third switch is connected to the pulse generator.

In certain embodiments, the first current mirror includes a first transistor and a second transistor. A first terminal of the first transistor and a first terminal of the second transistor are connected to the input voltage source. A second terminal of the second transistor is connected to the first terminal of the first switch. A control terminal of the first transistor is connected to the second terminal of the second transistor and a control terminal of the second transistor. A second terminal of the first transistor is connected to the second input terminal of the second comparator.

In certain embodiments, the first current mirror includes a capacitor through which the second terminal of the first transistor is grounded.

In certain embodiments, the second current mirror includes a first transistor and a second transistor. A first terminal of the first transistor and a first terminal of the second transistor are connected to the input voltage source. A second terminal of the first transistor is connected to the first terminal of the second switch. A control terminal of the second transistor is connected to the second terminal of the first transistor and a control terminal of the first transistor. A second terminal of the second transistor is connected to the error amplifier.

Therefore, the present disclosure provides the automatic bandwidth control system for any switching frequency of the power converter. When the switching frequency indicated by the external clock signal is larger than a preset switching frequency or an internal information frequency, the automatic bandwidth control system adjusts the internal information frequency to be equal to the switching frequency indicated by the external clock signal and increases the transconductance gain of the error amplifier. As a result, the bandwidth of a loop of the power converter increases, thereby reducing a drop of the output voltage of the power converter to improve a load transient performance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
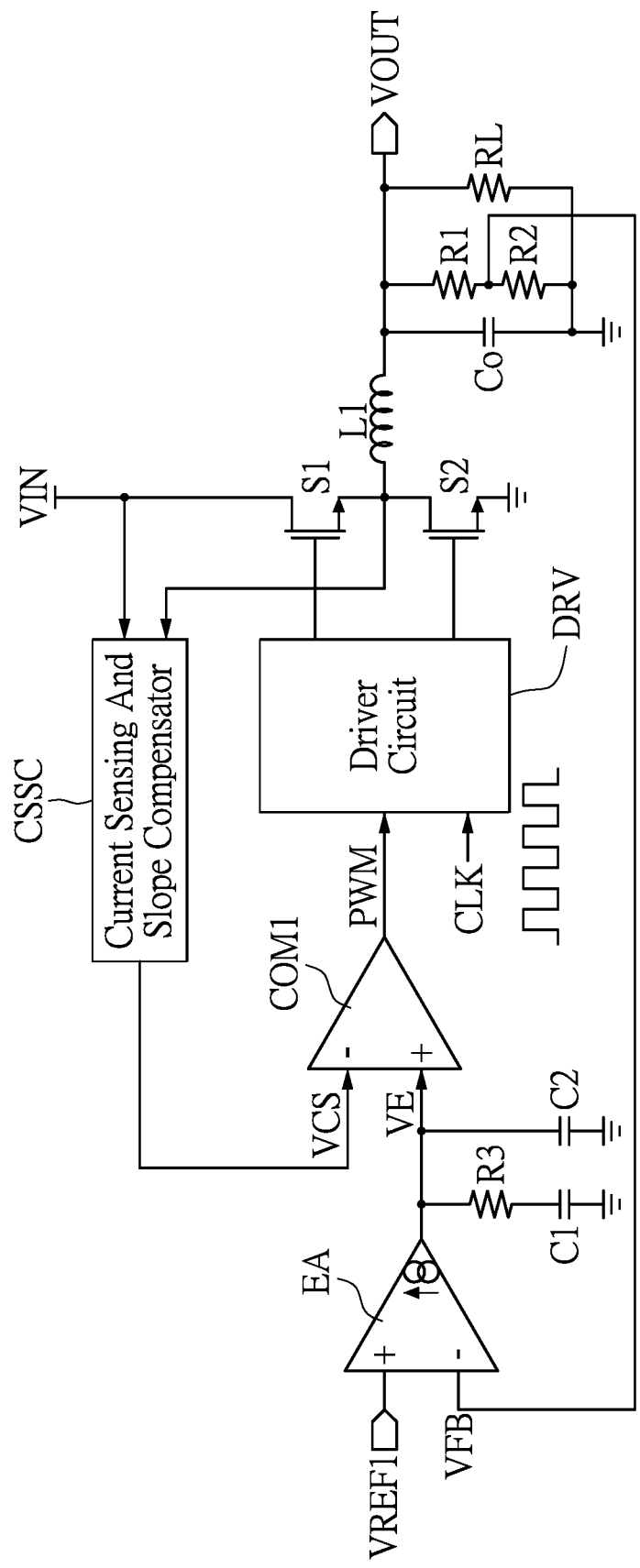
FIG. 1 is a circuit layout diagram of a power converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a power converter according to an embodiment of the present disclosure.

As shown in FIG. 1, the power converter includes an error amplifier EA, a first comparator COM1, a driver circuit DRV, a switch circuit and a current sensing and slope compensator CSSC. The switch circuit includes a first switch S1 and a second switch S2.

An input terminal of the switch circuit of the power converter that is a first terminal of the first switch S1 is connected to an input voltage source VIN. A second terminal of the first switch S1 is connected to a first terminal of the second switch S2. A second terminal of the second switch S2 is grounded. A control terminal of the first switch S1 and a control terminal of the second switch S2 are connected to an output terminal of the driver circuit DRV.

A node between the first switch S1 and the second switch S2 of the power converter is connected to one terminal of an inductor L1. Another terminal of the inductor L1 is grounded through an output capacitor Co. The output capacitor Co is connected in parallel to a voltage dividing circuit and an output resistor RL. The voltage dividing circuit includes a first resistor R1 and a second resistor R2, which are connected in series with each other and grounded.

One input terminal such as a non-inverting terminal of the error amplifier EA is connected to a first reference voltage source VREF1. Another input terminal such as an inverting terminal of the error amplifier EA is connected to an output terminal of the switch circuit through the voltage dividing circuit. In other words, the another input terminal of the error amplifier EA is connected to a node between the first resistor R1 and the second resistor R2. An output terminal of the error amplifier EA is grounded through a series circuit of a third resistor R3 and a first capacitor C1, and grounded through a second capacitor C2.

One input terminal such as an inverting terminal of the first comparator COM1 is connected to the input terminal of the switch circuit that is the first terminal of the first switch S1 through the current sensing and slope compensator CSSC. Another input terminal such as a non-inverting terminal of the first comparator COM1 is connected to the output terminal of the error amplifier EA. The current sensing and the slope compensator CSSC is connected to the first terminal of the first switch S1 and the node between the first switch S1 and the second switch S2. An input terminal of the driver circuit DRV is connected to an output terminal of the first comparator COM1.

The current sensing and the slope compensator CSSC is configured to detect a current flowing through the first terminal of the first switch S1 and a current flowing through the node between the first switch S1 and the second switch S2 to output a sensing comparing signal. The first comparator COM1 compares a voltage VE of an error amplified signal of the error amplifier EA with a voltage VCS of the sensing comparing signal to output a pulse width modulated signal PWM. The driver circuit DRV controls the first switch S1 and the second switch S2 according to the pulse width modulated signal PWM to control an output voltage signal VOUT at an output terminal of the power converter.

The voltage dividing circuit divides a voltage of the output voltage signal VOUT at the output internal of the power converter to generate a feedback voltage VFB at the node between the first resistor R1 and the second resistor R2. In the embodiment, a transconductance amplifier is used as the error amplifier EA of the power converter. The error amplifier EA multiplies a difference between the feedback voltage VFB and a first reference voltage supplied from the first reference voltage source VREF1 by a transconductance gain (gm) to output a current.

It is worth noting that a conventional power converter is designed to have a constant bandwidth. For example, when the bandwidth is set to 60 KHZ and a switching frequency of the first switch S1 and the second switch S2 of the power converter is 600 KHZ, the power converter has a good load transient performance. However, when the switching frequency increases, for example, the switching frequency increases from 600 KHZ to 2 MHz, an output current of the conventional power converter increases rapidly. Under this condition, since the bandwidth of the conventional power converter is fixed at the constant value such as 60 KHZ, an output voltage of the conventional power converter is greatly reduced, such that the power converter operating at a high frequency has a poor load transient performance, as shown in the following first equation:

$$Vdrop \propto \frac{\Delta Io \times 0.35}{Co \times fc},$$

wherein Vdrop represents a drop of the output voltage of the power converter, $\Delta Io$ represents an output current of the power converter, Co represents a capacitance of the output capacitor Co of the power converter, and fc represents a bandwidth of the power converter.

Figure 2:
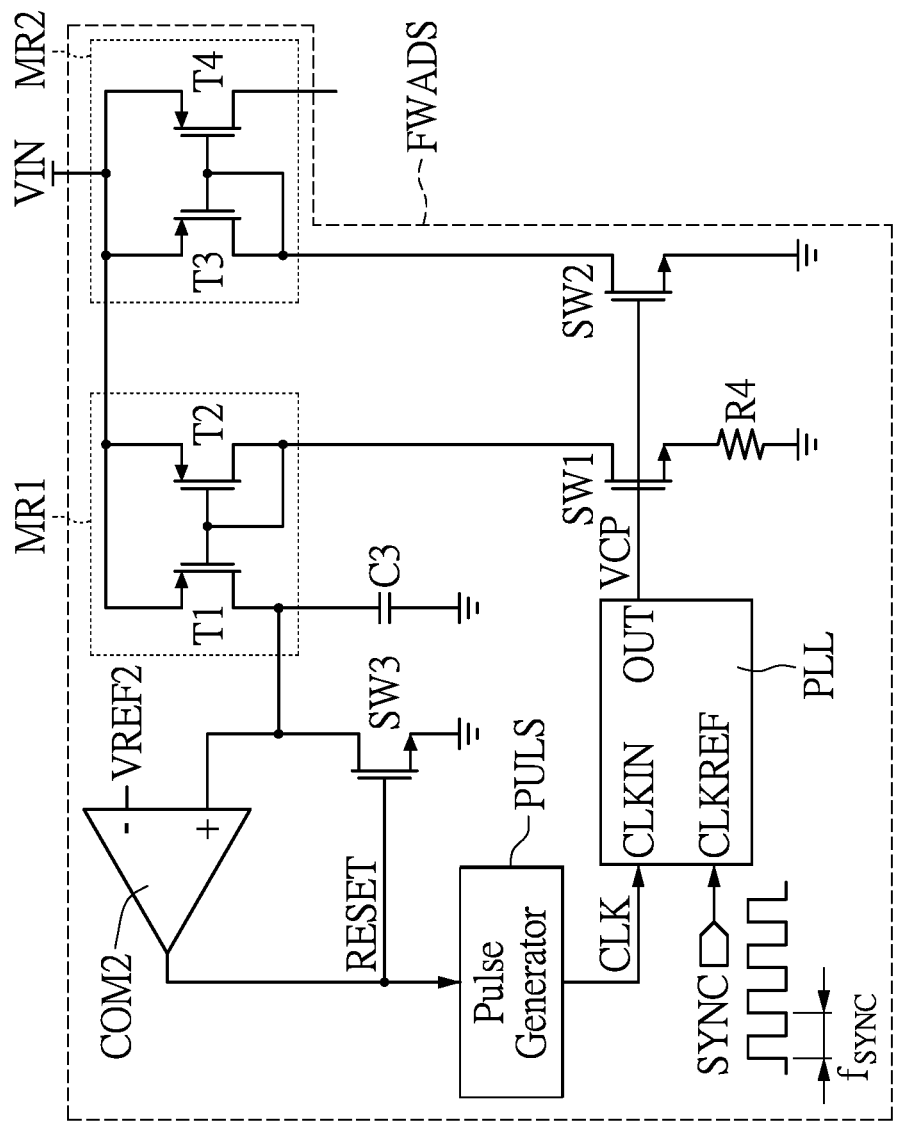
FIG. 2 is a circuit layout diagram of an automatic bandwidth control system for any switching frequency of the power converter according to the embodiment of the present disclosure.
Figure 3:
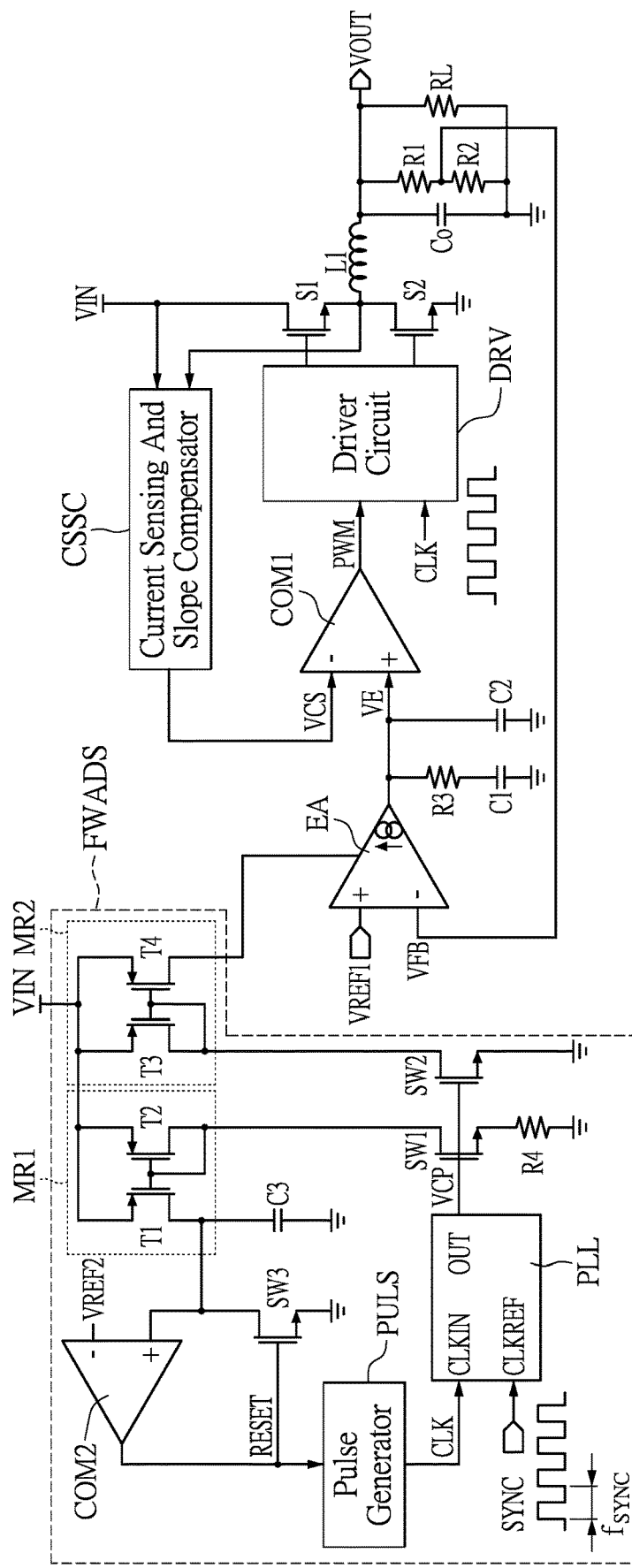
FIG. 3 is a circuit layout diagram of the automatic bandwidth control system of FIG. 2 for the power converter of FIG. 1.

In order to solve the above problems, the present disclosure provides an automatic bandwidth control system FWADS shown in FIG. 2, which is applied to the power converter shown in FIG. 1. As shown in FIG. 3, the automatic bandwidth control system FWADS is connected to the power converter, the connection of which is described specifically as follows.

Reference is made to FIGS. 1 to 3, wherein FIG. 1 is a circuit layout diagram of a power converter according to an embodiment of the present disclosure, FIG. 2 is a circuit layout diagram of an automatic bandwidth control system for any switching frequency of the power converter according to the embodiment of the present disclosure, and FIG. 3 is a circuit layout diagram of the automatic bandwidth control system of FIG. 2 for the power converter of FIG. 1.

As shown in FIG. 2, in the embodiment, the automatic bandwidth control system includes a pulse generator PULS, a control circuit PLL, a first switch SW1, a first current mirror MR1, a second comparator COM2, a second switch SW2, and a second current mirror MR2.

The pulse generator PULS is connected to the second comparator COM2 and configured to output a preset clock signal CLK according to a comparing signal from the second comparator COM2. The preset clock signal CLK has a preset switching frequency or an internal information frequency such as 600 KHz, but the present disclosure is not limited thereto.

A clock input terminal CLKIN of the control circuit PLL is connected to the pulse generator PULS. An external clock input terminal CLKREF of the control circuit PLL is connected to an external circuit. The control circuit PLL is configured to compare a frequency such as 600 KHz of the preset clock signal CLK with a frequency $F_{SYNC}$ such as 2 MHz of an external clock signal SYNC from the external circuit to output a control signal.

The first switch SW1 and the second switch SW2 may be N-channel enhancement MOSFETs, but they may be replaced with other types of transistors in practice. A control terminal of the first switch SW1 and a control terminal of the second switch SW2 are connected to an output terminal OUT of the control circuit PLL. The control circuit PLL outputs the control signal to control the first switch SW1 and the second switch SW2.

A second terminal of the first switch SW1 is grounded through a fourth resistor R4. A first terminal of the first switch SW1 is connected to the first current mirror MR1. The first current mirror MR1 includes a first transistor T1 and a second transistor T2. A first terminal of the first transistor T1 and a first terminal of the second transistor T2 are connected to the input voltage source VIN. A second terminal of the second transistor T2 is connected to the first terminal of the first switch SW1. A control terminal of the first transistor T1 is connected to a control terminal of the second transistor T2 and the second terminal of the second transistor T2. A second terminal of the first transistor T1 is grounded through a third capacitor C3.

The second comparator COM2 has a first input terminal such as an inverting input terminal and a second input terminal such as a non-inverting input terminal. The first input terminal of the second comparator COM2 is connected to a second reference source VREF2. The second input terminal of the second comparator COM2 is connected to a second terminal of the first transistor T1 of the first current mirror MR1 and the third capacitor C3. An output terminal of the second comparator COM2 is connected to the pulse generator PULS. The second comparator COM2 is configured to compare an output voltage of the second reference source VREF2 with an output voltage of the first current mirror MR1 that is a voltage of the second terminal of the first transistor T1 or a voltage of the third capacitor C3 to output a comparing signal to the pulse generator PULS.

A first terminal of a third switch SW3 is connected to the second input terminal of the second comparator COM2. A second terminal of the third switch SW3 is grounded. A control terminal of the third switch SW3 is connected to the pulse generator PULS. When the second comparator COM2 outputs the comparing signal at a high level, the third switch SW3 is turned on such that a reset operation RESET is conducted. As a result, a voltage of the second input terminal of the second comparator COM2 reduces to zero.

As described above, the control circuit PLL controls the first switch SW1 according to a frequency $f_{SYNC}$ of the external clock signal SYNC. For example, a frequency such as 600 KHZ of the power converter increases to be equal to the frequency $f_{SYNC}$ such as 2 MHz of the external clock signal SYNC from the preset clock signal CLK of 600 KHZ. Under this condition, the control circuit PLL controls the first switch SW1 to increase the current flowing through the first switch SW1, and the pulse generator PULS accordingly outputs the preset clock signal CLK having a higher frequency. The control circuit PLL controls the second switch SW2 according to the preset clock signal CLK having the higher frequency.

A current of the first current mirror MR1 is proportional to the frequency of the preset clock signal CLK outputted by the pulse generator PULS, which is represented by the following second equation:

$$fclk = \frac{IT1}{C3 \times VR2},$$

wherein fclk represents the frequency of the preset clock signal CLK, IT1 represents the current flowing through the first switch SW1 of the first current mirror MR1, C3 represents a capacitance of the third capacitor C3, and VR2 represents a second reference voltage of the second reference voltage source VREF2.

A ratio of the first transistor T1 of the first current mirror MR1 to the second transistor T2 is 1:1, a relationship between the current of the first transistor T1 and a current of the second transistor T2 is represented by the following third equation:

$$IT1=IT2,$$

wherein IT1 represents the current of the first transistor T1 and IT2 represents the current of the second transistor T2.

On the other hand, the second current mirror MR2 includes a first transistor T3 and a second transistor T4. A first terminal of the first transistor T3 and a first terminal of the second transistor T4 are connected to the input voltage source VIN. A second terminal of the first transistor T3 is connected to a first terminal of the second switch SW2. A second terminal of the second switch SW2 is grounded. A control terminal of the second transistor T4 is connected to a control terminal of the first transistor T3 and the second terminal of the first transistor T3. As shown in FIG. 3, a second terminal of the second switch SW4 is connected to a current input terminal of the error amplifier EA.

The control circuit PLL controls the second switch SW2 according to the frequency $f_{SYNC}$ of the external clock signal SYNC to adjust a current of the first transistor T3 of the second current mirror MR2 so as to adjust a current of the second transistor T4 of the second current mirror MR2. For example, the current of the second transistor T4 is equal to the current of the first transistor T3, but the present disclosure is not limited thereto.

A relationship between the current of the second transistor T2 of the first current mirror MR1 and a voltage of the control terminal of the second switch SW2 is represented by the following fourth equation:

$$IT2 \approx \frac{VCP - VTH1}{R4},$$

wherein IT2 represents the current of the second transistor T2 of the first current mirror MR1, VCP represents the voltage of the control terminal of the first switch SW1 shown in FIGS. 2 and 3, VTH1 represents a threshold voltage of the first switch SW1, and R4 represents a resistance of the fourth resistor R4.

The above fourth equation is converted into the following fifth equation:

$$VCP \approx IT2 \times R4 + VTH1.$$

The current of the first transistor T3 of the second current mirror MR2 is calculated by the fifth equation and represented by the following sixth equation:

$$IT3=K1\lambda(IT2 \times R4+VTH1-VTH2)^2,$$

wherein IT3 represents the current of the first transistor T3 of the second current mirror MR2, K1 represents a ratio of the first transistor T3 and the second transistor T2, R4 represents a resistance of the fourth resistor R4 shown in FIGS. 2 and 3, and VTH1 and VTH2 respectively represents threshold voltages of the first switch SW1 and the second switch SW2.

The above sixth equation may be simplified to the following seventh equation 7:

$$IT3=K1 \times (IT2 \times R4)^2.$$

If a ratio of the first transistor T3 of the second current mirror MR2 to the second transistor T4 is 1:1, a relationship between the current of the first transistor T3 and the current of the second transistor T4 is represented by the following eighth equation:

$$IT3=IT4,$$

wherein IT3 represents the current of the first transistor T3 of the second current mirror MR2, and IT4 represents the current of the second transistor T4 of the second current mirror MR2.

A ratio of the first transistor T1 and the second transistor T4 is represented by the following ninth equation:

$$K1 = \frac{1}{R4^2}.$$

The above third, eighth and ninth equations are substituted into the seventh equation to simplify the seventh equation to obtain the following tenth equation:

$$IT4=IT1^2,$$

wherein IT4 represents the current of the second transistor T2 of the second current mirror MR2, and IT1 represents the current of the first switch SW1 of the first current mirror MR1.

It can be seen from the second equation and the tenth equation that, when the switching frequency of the power converter increases, for example, from a preset frequency of the preset clock signal CLK to the frequency $f_{SYNC}$ of the external clock signal SYNC, the control circuit PLL controls the first switch SW1 to increase the current flowing through the first switch SW1. The current of the second transistor T4 of the second current mirror MR2 increases by a square factor of the current flowing through the first switch SW1.

As shown in FIG. 3, the second terminal of the second transistor T4 of the second current mirror MR2 of the automatic bandwidth control system FWADS in the embodiment as shown in FIG. 2 is connected to the current input terminal of the error amplifier EA of the power converter shown in FIG. 1. A current outputted by the second transistor T4 of the second current mirror MR2 is provided to the error amplifier EA.

It is worth noting that the bandwidth of the power converter applying the automatic bandwidth control system FWADS in the embodiment is adjustable, in comparison with the constant bandwidth of the conventional power converter. The transconductance gain of the error amplifier EA varies with the current of the second transistor T4 of the second current mirror MR2 such that the bandwidth of the power converter is adjusted according to the frequency $f_{SYNC}$ of the external clock signal SYNC.

The bandwidth of the power converter is proportional to the transconductance gain of the error amplifier EA, which is represented by the following eleventh equation:

$$fc = \frac{gm \times Rc \times Gcs}{2\pi \times Co} \times \frac{VR1}{VOUT},$$

wherein fc represents the bandwidth of the power converter, gm represents the transconductance gain of the error amplifier EA, Rc represents a resistance of the third resistor R3 of the power converter, Gcs represents a current sensing parameter of the current sensing and slope compensator CSSC of the power converter, Co represents the capacitance of the output capacitor Co, VR1 represents the first reference voltage of the first reference voltage source VREF1 of the power converter, and VOUT represents a voltage of an output voltage signal of the power converter.

Figure 4:
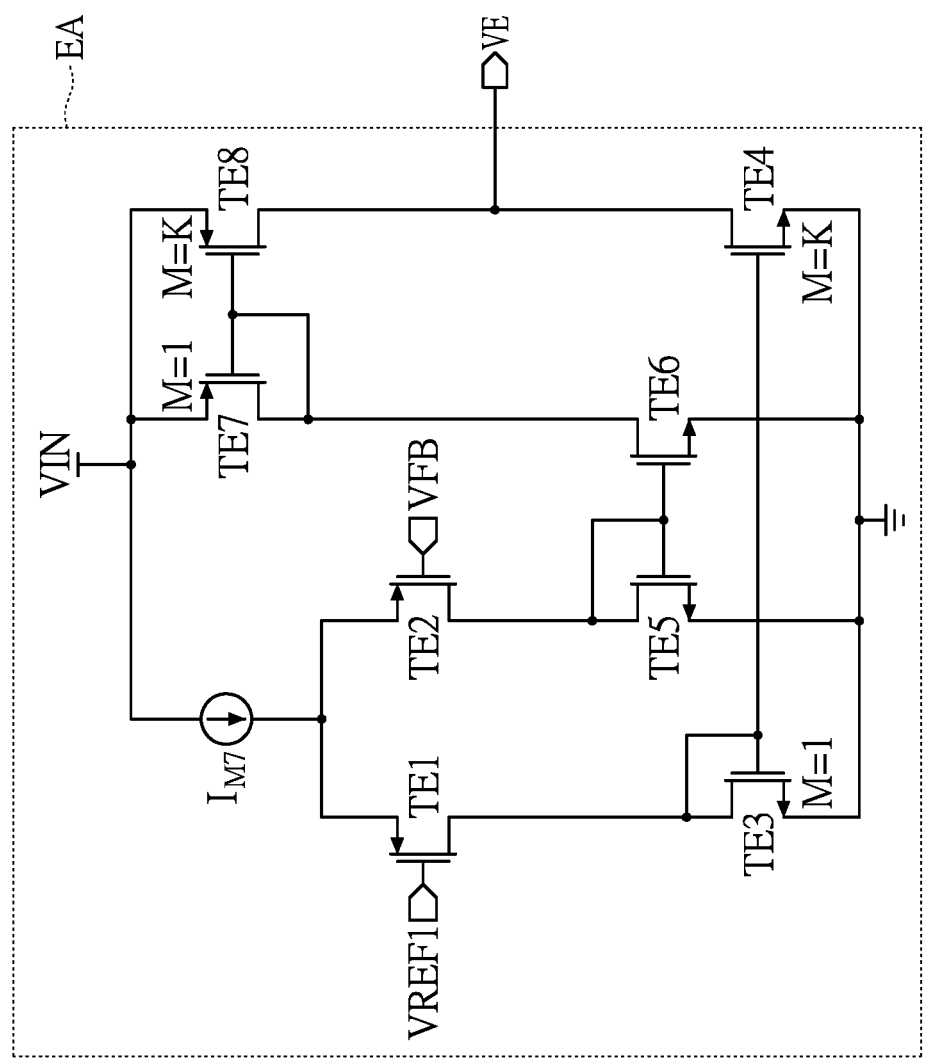
FIG. 4 is an internal circuit diagram of an error amplifier of the power converter.

Reference is made to FIGS. 3 and 4, wherein FIG. 4 is an internal circuit diagram of an error amplifier of the power converter.

As shown in FIG. 4, the error amplifier EA of the power converter includes a first input differential pair, a third current mirror, a fourth current mirror and a fifth current mirror. The first input differential pair includes a first transistor TE1 and a second transistor TE2. The third current mirror includes a third transistor TE3 and a fourth transistor TE4. The fourth current mirror includes a fifth transistor TE5 and a sixth transistor TE6. The fifth current mirror includes a seventh transistor TE7 and an eighth transistor TE8.

The first transistor TE1 and the second transistor TE2 are connected to a current source IM7, and connected respectively to the third transistor TE3 and the fifth transistor TE5. The fourth transistor TE4 is connected to the third transistor TE3 and the eighth transistor TE8. The sixth transistor TE6 is connected to the fifth transistor TE5 and the seventh transistor TE7. The seventh transistor TE7 and the eighth transistor TE8 are connected to the input voltage source VIN.

A ratio of the first transistor TE1 and the second transistor TE2 of the first input differential pair is 1:1, a relationship between a current of the first transistor TE1 and a current of the second transistor TE2 is represented by the following twelfth equation:

$$ITE1=ITE2,$$

wherein ITE1 represents the current of the first transistor TE1, and ITE2 represents the current of the second transistor TE2.

A ratio of the fifth transistor TE5 and the sixth transistor TE6 of the fourth current mirror is 1:1, a relationship between a current of the fifth transistor TE5 and a current of the sixth transistor TE6 is represented by the following thirteenth equation:

$$ITE5=ITE6,$$

wherein ITE5 represents the current of the fifth transistor TE51, and ITE6 represents the current of the sixth transistor TE6.

A ratio of the third transistor TE3 and the fourth transistor TE4 of the third current mirror is 1:K, a relationship between a current of the third transistor TE3 and a current of the fourth transistor TE4 is represented by the following fourteenth equation:

$$ITE4=K \times ITE3,$$

wherein ITE4 represents the current of the fourth transistor TE4, and ITE3 represents the current of the third transistor TE3.

A ratio of the seventh transistor TE7 and the eighth transistor TE8 of the fifth current mirror is 1:K, a relationship between a current of the seventh transistor TE7 and a current of the eighth transistor TE8 is represented by the following fifteenth equation:

$$ITE8=K \times ITE7,$$

wherein ITE8 represents the current of the eighth transistor TE8, and ITE7 represents the current of the seventh transistor TE7.

A transconductance gain of the second transistor TE2 of the first input differential pair is proportional to the current of the first transistor T1 of the first current mirror MR1 in the tenth equation and is represented by the following sixteenth equation:

$$gm2 \propto \sqrt{2 \times \frac{IT1^2}{2} \times \left(\mu Cox \frac{W}{L}\right)},$$

wherein gm2 represents the transconductance gain of the second transistor TE2, IT1 represents the current flowing through the first switch SW1 of the first current mirror MR1, represents a carrier mobility of the second transistor TE2, Cox represents a oxide capacitor of the second transistor TE2, L represents a length of a channel of a gate of the second transistor TE2, and W represents a width of the channel of the gate of the second transistor TE2.

A relationship of the transconductance gm of the error amplifier EA in the eleventh equation and a transconductance gm2 of the second transistor TE2 in the sixteenth equation is represented by the following seventeenth equation:

$$gm \propto K \times gm2$$

It can be seen from the second equation, the eleventh equation and the tenth equation that, the bandwidth of the power converter is proportional to the frequency of the power converter. Therefore, when the switching frequency of the power converter increases with the frequency $f_{SYNC}$ of the external clock signal SYNC, the control circuit PLL of the automatic bandwidth control system FWADS in the embodiment increases the current to be outputted to the error amplifier EA from the second transistor T4. As a result, the bandwidth of the power converter increases with increasing the transconductance gain of the power converter. Therefore, when the power converter operates at a high frequency, the power converter has a better load transient performance.

Figure 5A:
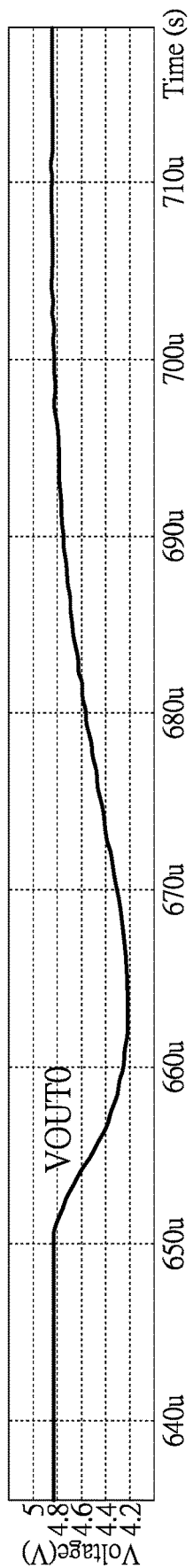
FIG. 5A is a waveform diagram of an output voltage signal of the power converter during a load current conversion process of 10 mA to 5 A when a frequency of an external clock signal is 600 KHz.
Figure 5B:
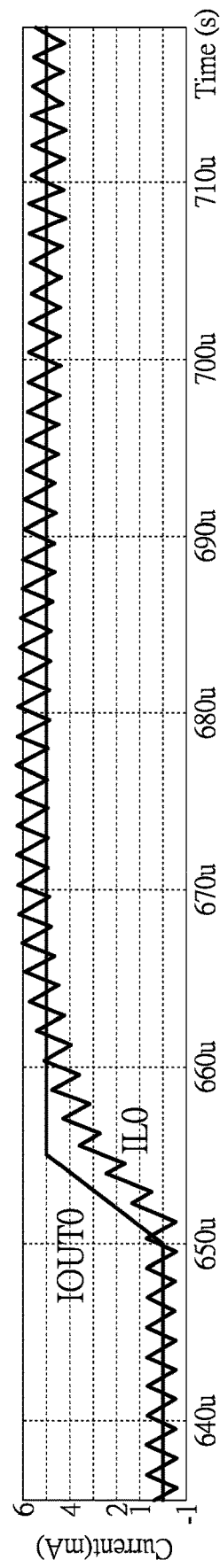
FIG. 5B is a waveform diagram of an output current and an inductor current of the power converter during the load current conversion process of 10 mA to 5 A when the frequency of the external clock signal is 600 KHz.

Reference is made to FIGS. 5A and 5B, wherein FIG. 5A is a waveform diagram of an output voltage signal of the power converter during a load current conversion process of 10 mA to 5 A when a frequency of an external clock signal is 600 KHz, and FIG. 5B is a waveform diagram of an output current and an inductor current of the power converter during a load current conversion process of 10 mA to 5 A when a frequency of an external clock signal is 600 KHz.

When the switching frequency of the power converter shown in FIG. 1 is equal to the preset frequency of 600 KHZ of the external clock signal CLK and the bandwidth of the power converter is 60 KHZ, the power converter generates an output voltage signal VOUT0 as shown in FIG. 5A, and generates an output current IOUT0 and an inductor current IL0 flowing through the inductor L1 of the power converter as shown in FIG. 5B.

Figure 6A:
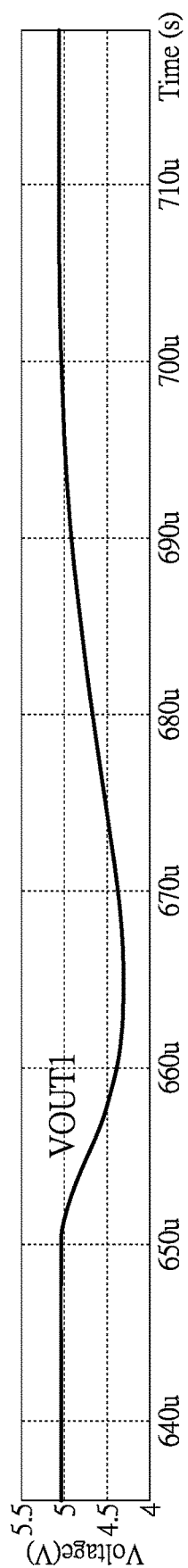
FIG. 6A is a waveform diagram of an output voltage signal of a conventional power converter during a load current conversion process of 10 mA to 5 A when a frequency of an external clock signal is 2 MHz.
Figure 6B:
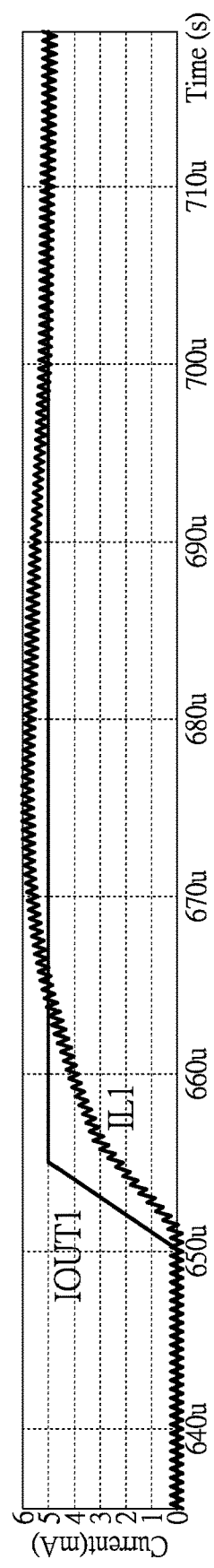
FIG. 6B is a waveform diagram of an output current and an inductor current of the conventional power converter during the load current conversion process of 10 mA to 5 A when the frequency of the external clock signal is 2 MHz.

Reference is made to FIGS. 5A, 5B, 6A and 6B, wherein FIG. 6A is a waveform diagram of an output voltage signal of a conventional power converter during a load current conversion process of 10 mA to 5 A when a frequency of an external clock signal is 2 MHz, and FIG. 6B is a waveform diagram of an output current and an inductor current of the conventional power converter during the load current conversion process of 10 mA to 5 A when the frequency of the external clock signal is 2 MHz.

When the switching frequency of the conventional power converter increases to be equal to the frequency of 2 MHz of the external clock signal from the preset frequency of 600 KHZ, the conventional power converter generates an output current IOUT1 and an inductor current IL1 flowing through the inductor L1 as shown in FIG. 6B during the load current conversion process of 10 mA to 5 A. As a result, an output voltage signal VOUT0 shown in FIG. 5A changes to an output voltage signal VOUT1 shown in FIG. 6A. It is apparent that the output voltage signal VOUT1 drops by 732 mV. Accordingly, the conventional power converter has a poor load transient performance.

Figure 7A:
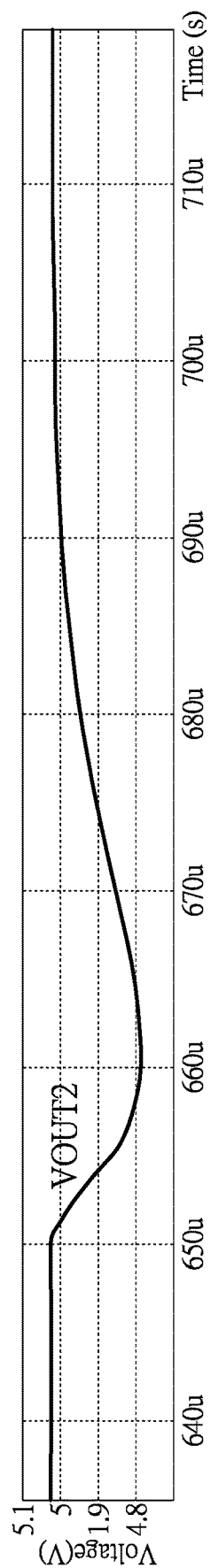
FIG. 7A is a waveform diagram of an output voltage signal of the power converter during the load current conversion process of 10 mA to 5 A after a transconductance gain of the power converter of FIG. 1 is adjusted based on a frequency of 2 MHz by the automatic bandwidth control system of FIG. 2.
Figure 7B:
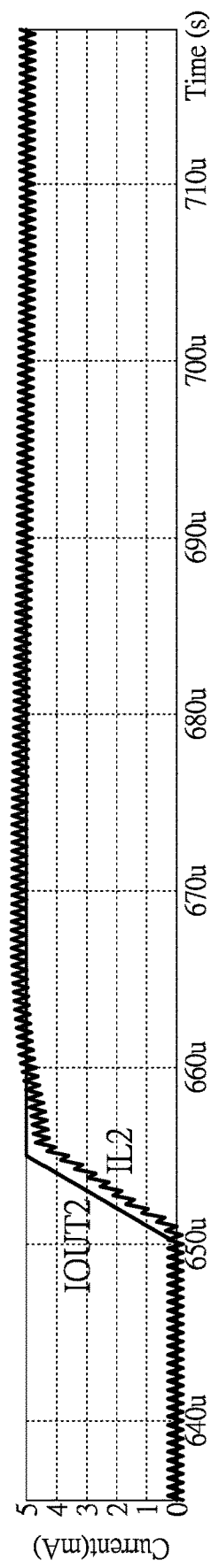
FIG. 7B is a waveform diagram of an output current and an inductor current of the power converter during the load current conversion process of 10 mA to 5A after the transconductance gain of the power converter of FIG. 1 is adjusted based on the frequency of 2 MHz by the automatic bandwidth control system of FIG. 2.

Reference is made to FIGS. 6A, 6B, 7A and 7B, wherein FIG. 7A is a waveform diagram of an output voltage signal of the power converter during the load current conversion process of 10 mA to 5 A after a transconductance gain of the power converter of FIG. 1 is adjusted based on a frequency of 2 MHz by the automatic bandwidth control system of FIG. 2, and FIG. 7B is a waveform diagram of an output current and an inductor current of the power converter during the load current conversion process of 10 mA to 5 A after the transconductance gain of the power converter of FIG. 1 is adjusted based on the frequency of 2 MHz by the automatic bandwidth control system of FIG. 2.

As shown in FIG. 3, the automatic bandwidth control system FWADS shown in FIG. 2 is applied to the power converter shown in FIG. 1. Under this condition, when the switching frequency of the power converter increases to be equal to the frequency of 2 MHz of the external clock signal from the preset frequency of 600 KHZ, the power converter generates an output current IOUT2 and an inductor current IL2 flowing through the inductor L1 as shown in FIG. 7B. As a result, the output voltage signal VOUT0 shown in FIG. 5A changes to an output voltage signal VOUT2 shown in FIG. 7A. The output voltage signal VOUT2 only drops by 237 mV.

As described above, if the power converter shown in FIG. 1 applies the automatic bandwidth control system FWADS of the present disclosure, a drop of the output voltage of the power converter can be reduced, and a performance of the load transient of 10 mA to 5 A can be improved.

Figure 8A:
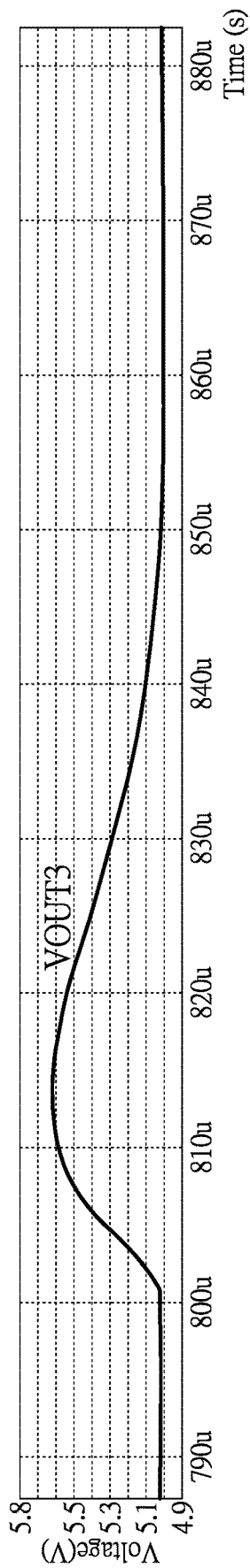
FIG. 8A is a waveform diagram of an output voltage signal of the power converter during a load current conversion process of 5 A to 10 mA when a frequency of an external clock signal is 600 KHz.
Figure 8B:
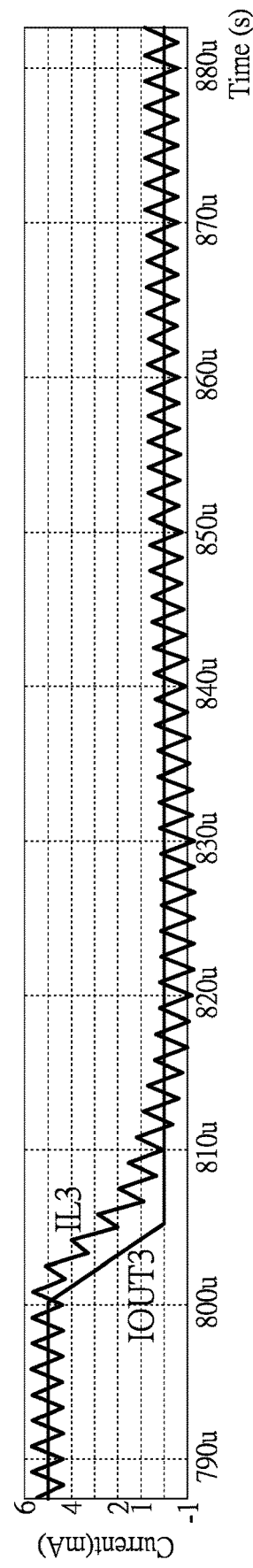
FIG. 8B is a waveform diagram of an output current and an inductor current of the power converter during the load current conversion process of 5 A to 10 mA when the frequency of the external clock signal is 600 KHz.

Reference is made to FIGS. 8A and 8B, wherein FIG. 8A is a waveform diagram of an output voltage signal of the power converter during a load current conversion process of 5 A to 10 mA when a frequency of an external clock signal is 600 KHz, and FIG. 8B is a waveform diagram of an output current and an inductor current of the power converter during the load current conversion process of 5 A to 10 mA when the frequency of the external clock signal is 600 KHz.

The switching frequency of the power converter shown in FIG. 1 is equal to the preset frequency of 600 KHZ of the external clock signal CLK and the bandwidth of the power converter is 60 KHZ, the power converter generates an output voltage signal VOUT3 as shown in FIG. 8A, and generates an output current IOUT3 and an inductor current IL3 flowing through the inductor L1 of the power converter as shown in FIG. 8B, during the load current conversion process of 5 A to 10 mA.

Figure 9A:
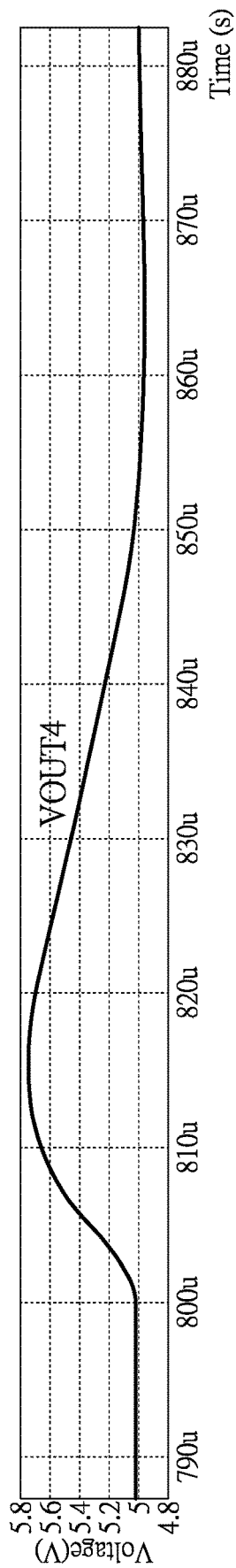
FIG. 9A is a waveform diagram of an output voltage signal of the conventional power converter during a load current conversion process of 5 A to 10 mA when a frequency of an external clock signal is 2 MHz.
Figure 9B:
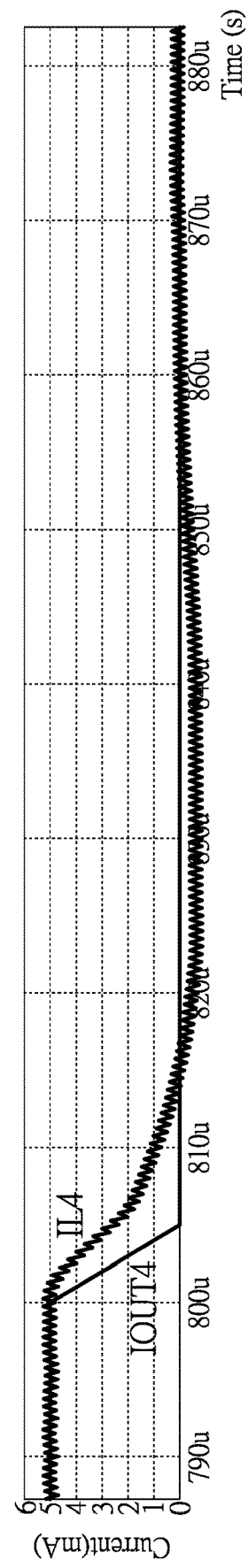
FIG. 9B is a waveform diagram of an output current and an inductor current of the conventional power converter during the load current conversion process of 5 A to 10 mA when the frequency of the external clock signal is 2 MHz.

Reference is made to FIGS. 8A, 8B, 9A and 9B, wherein FIG. 9A is a waveform diagram of an output voltage signal of the conventional power converter during a load current conversion process of 5 A to 10 mA when a frequency of an external clock signal is 2 MHz, and FIG. 9B is a waveform diagram of an output current and an inductor current of the conventional power converter during the load current conversion process of 5 A to 10 mA when the frequency of the external clock signal is 2 MHz.

When the switching frequency of the power converter increases to be equal to the frequency $f_{SYNC}$ such as 2 MHz of the external clock signal SYNC from the preset clock signal CLK of 600 KHZ, the power converter generates an inductor current IL4 flowing through the inductor L1 and an output current IOUT4 as shown in FIG. 9B. As a result, the output voltage signal VOUT3 shown in FIG. 8A changes to an output voltage signal VOUT4, which overshoots to 726 mV. Under this condition, the power converter has a poor load transient performance.

Figure 10A:
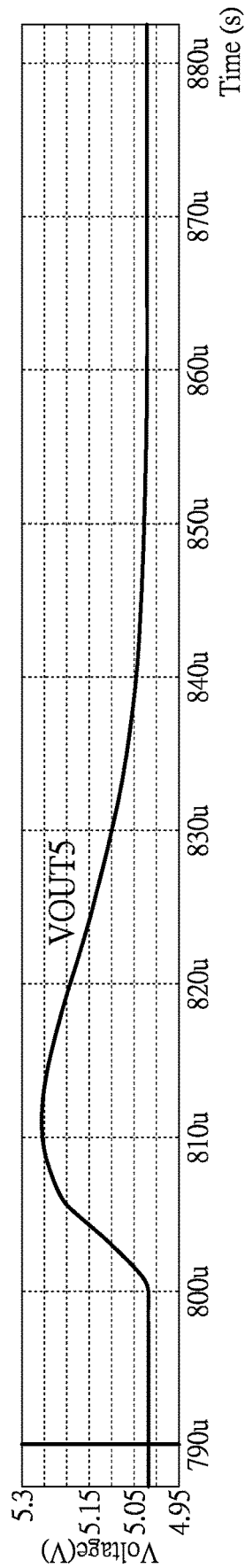
FIG. 10A is a waveform diagram of an output voltage signal of the power converter during the load current conversion process of 5 A to 10 mA after a transconductance gain of the power converter of FIG. 1 is adjusted based on a frequency of 2 MHz by the automatic bandwidth control system of FIG. 2.
Figure 10B:
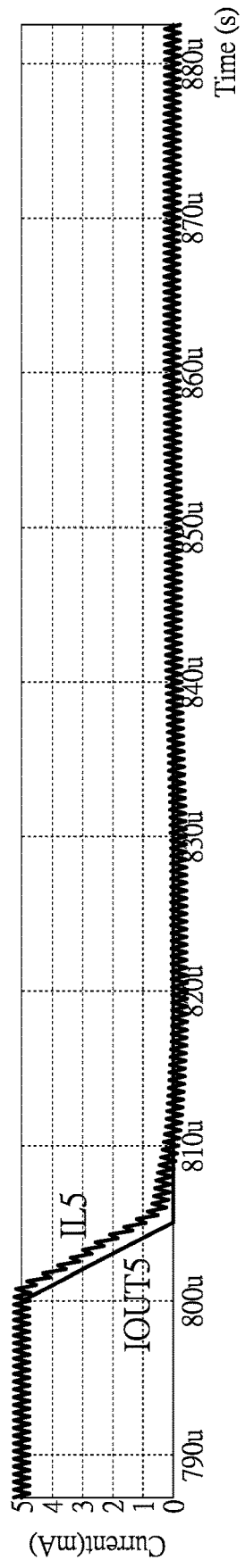
FIG. 10B is a waveform diagram of an output current and an inductor current of the power converter during the load current conversion process of 5 A to 10 mA after the transconductance gain of the power converter of FIG. 1 is adjusted based on the frequency of 2 MHz by the automatic bandwidth control system of FIG. 2.

Reference is made to FIGS. 9A, 9B, 10A and 10B, wherein FIG. 10A is a waveform diagram of an output voltage signal of the power converter during the load current conversion process of 5 A to 10 mA after a transconductance gain of the power converter of FIG. 1 is adjusted based on a frequency of 2 MHz by the automatic bandwidth control system of FIG. 2, and FIG. 10B is a waveform diagram of an output current and an inductor current of the power converter during the load current conversion process of 5 A to 10 mA after the transconductance gain of the power converter of FIG. 1 is adjusted based on the frequency of 2 MHz by the automatic bandwidth control system of FIG. 2.

The automatic bandwidth control system FWADS of the present disclosure as shown in FIG. 2 is applied to the power converter shown in FIG. 1. Under this condition, when the switching frequency of the power converter increases to be equal to the frequency of 2 MHz of the external clock signal from the preset clock signal of 600 KHZ, the power converter generates an inductor current IL5 flowing through the inductor L1 and an output current IOUT5 as shown in FIG. 10B. As a result, the output voltage signal VOUT3 shown in FIG. 8A changes to an output voltage signal VOUT5 as shown in FIG. 10A. The output voltage signal VOUT5 only overshoots by 237 mV.

As a result, the power converter shown in FIG. 1 applies the automatic bandwidth control system FWADS of the present disclosure, a drop of the output voltage of the power converter can be reduced, and the load transient performance of 5 A to 10 mA can be improved.

In summary, the present disclosure provides the automatic bandwidth control system for any switching frequency of the power converter. When the switching frequency indicated by the external clock signal is larger than the preset switching frequency or the internal information frequency, the automatic bandwidth control system adjusts the internal information frequency to be equal to the switching frequency indicated by the external clock signal and increases the transconductance gain of the error amplifier. As a result, the bandwidth of a loop of the power converter increases, thereby reducing the drop of the output voltage of the power converter to improve the load transient performance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic bandwidth control system for any switching frequency of a power converter, wherein the power converter includes an error amplifier, a first comparator, a driver circuit and a switch circuit, an input terminal of the error amplifier is connected to a first reference voltage source, another input terminal of the error amplifier is connected to an output terminal of the switch circuit, an input terminal of the first comparator is connected to an input terminal of the switch circuit, another input terminal of the first comparator is connected to an output terminal of the error amplifier, the input terminal of the switch circuit is connected to an input voltage source, an input terminal of the driver circuit is connected to an output terminal of the first comparator, a control terminal of the switch circuit is connected to an output terminal of the driver circuit, the automatic bandwidth control system comprises: a pulse generator configured to output a preset clock signal according to a comparing signal; a control circuit connected to the pulse generator and configured to compare a frequency of the preset clock signal with a frequency of an external clock signal from an external circuit to output a control signal; a first switch, a control terminal of the first switch being connected to the control circuit and configured to be controlled by the control signal; a first current mirror connected to the input voltage source and a first terminal of the first switch, wherein a second terminal of the first switch is grounded; a second comparator having a first input terminal and a second input terminal, wherein the first input terminal is connected to a second reference voltage source, the second input terminal is connected to the first current mirror, an output terminal of the second comparator is connected to the pulse generator, and the second comparator is configured to compare an output voltage of the second reference voltage source with an output voltage of the first current mirror to output the comparing signal; a second switch, wherein a control terminal of the second switch is connected to the control circuit and configured to be controlled by the control signal; and a second current mirror connected to the input voltage source and a first terminal of the second switch, wherein a second terminal of the second switch is grounded, the second current mirror is connected to the error amplifier and provides a current to the error amplifier, and a transconductance gain of the error amplifier varies with the current such that a bandwidth of the power converter is adjusted with the frequency of the external clock signal.

2. The automatic bandwidth control system of claim 1, wherein the control circuit includes a phase-locked loop.

3. The automatic bandwidth control system of claim 1, further comprising:
   a third switch, wherein a first terminal of the third switch is connected to the second input terminal of the second comparator, a second terminal of the third switch is grounded, and a control terminal of the third switch is connected to the pulse generator.

4. The automatic bandwidth control system of claim 1, wherein the first current mirror includes a first transistor and a second transistor, a first terminal of the first transistor and a first terminal of the second transistor are connected to the input voltage source, a second terminal of the second transistor is connected to the first terminal of the first switch, a control terminal of the first transistor is connected to the second terminal of the second transistor and a control terminal of the second transistor, and a second terminal of the first transistor is connected to the second input terminal of the second comparator.

5. The automatic bandwidth control system of claim 4, further comprising:
   a capacitor through which the second terminal of the first transistor is grounded.

6. The automatic bandwidth control system of claim 1, wherein the second current mirror includes a first transistor and a second transistor, a first terminal of the first transistor and a first terminal of the second transistor are connected to the input voltage source, a second terminal of the first transistor is connected to the first terminal of the second switch, a control terminal of the second transistor is connected to the second terminal of the first transistor and a control terminal of the first transistor, and a second terminal of the second transistor is connected to the error amplifier.

\* \* \* \* \*